United States Patent [19]

Earp

[11] Patent Number: 5,719,823
[45] Date of Patent: Feb. 17, 1998

[54] GROUND PENETRATING SONAR

[75] Inventor: Ronald Lee Earp, Burlington, N.C.

[73] Assignee: Lucent Technologies Inc., Murray Hill, N.J.

[21] Appl. No.: 800,871

[22] Filed: Feb. 14, 1997

Related U.S. Application Data

[60] Provisional application No. 60/015,859, Jul. 8, 1996.
[51] Int. Cl.[6] .................................................. G01S 15/00
[52] U.S. Cl. ........................................ 367/92; 367/138
[58] Field of Search ........................................ 367/92, 138

[56] References Cited

U.S. PATENT DOCUMENTS

| | | | |
|---|---|---|---|
| 4,308,599 | 12/1981 | Thiele | 367/92 |
| 5,025,423 | 6/1991 | Earp | 367/137 |

*Primary Examiner*—Daniel T. Pihulic

[57] ABSTRACT

A ground-penetrating sonar echo locating device uses acoustic energy to locate underground structures, such as piping. A transducer, driven with two frequencies whose amplitudes would be rapidly attenuated in surface or through-the-ground transmission, is directed toward the ground through a silastic waveguide having a non-linear characteristic that produces a narrow beam of acoustic energy having neglible side lobes at a third frequency that is relatively unattenuated in ground transmission to produce reflections indicative of sub-soil conditions.

20 Claims, 1 Drawing Sheet

GROUND PENETRATING SONAR

This application claims the benefit of U.S. Provisional Application No. 60/015,859, filed Jul. 8, 1996.

FIELD OF THE INVENTION

This invention relates to echo location and more particularly to the use of sound waves to locate underground objects.

BACKGROUND OF THE INVENTION

Much work has been done in both terrestrial and oceanic seismography in which reflections of acoustic waves, that occur when incident acoustic waves strike an object of different density than the medium in which the wave is traveling, are analyzed to discern, identify and classify targets of interest. The sonar "ping" is a familiar example of a simple echo location system that may employ a circumnavigational wave for detecting undersea objects. In my prior U.S. Pat. No. 5,025,423 issued Jun. 8, 1991 I disclose a more sophisticated system, commercially known as the Enhanced Bottom Sonar System or EBBS, which identifies objects on the ocean floor by launching bursts of acoustic wave energy at different frequencies, collecting the reflected signals and comparing the collected data with a library of data sets, each set corresponding to the backscatter energy of a particular type of object. The library set that best matches the collected data identifies what the object on ocean floor is.

The sonar system of the '423 patent employed a narrow acoustic beam having an elliptical cross-section that was achieved with an array having as many as 25 transmitting transducers to locate objects on the ocean floor. However, such an array would be too unwieldily for use on land in locating buried underground structures, such as metallic and non-metallic utility pipes, in urban areas. To locate such objects it would be desirable to form a near-field, narrow acoustic beam with negligible side lobes with a single transducer. Of course such a beam should be one which could be launched into the ground rather than into sea water and the amplitude of the beam should not be unduly attenuated by the ground through which it travels, i.e., the transmitting transducer's output impedance should approach a match with the impedance of the ground rather than with that of the ocean.

SUMMARY OF THE INVENTION

The foregoing and other objects of the present invention are achieved in the illustrative embodiment in which a pair of acoustic waves each of which would rapidly be attenuated in surface or through-the-ground transmission are launched into a waveguide directed at the ground. The waveguide is made of an elastomeric material having a non-linear transmission characteristic at the frequencies of the acoustic waves introduced into it. In one example a silicone elastomeric material is employed whose density changes in response to the acoustic pressure of the waves launched within it. The length of the waveguide in the desired direction of propagation is made to be long enough so that the waves introduced interact with the medium for at least one wavelength and thereby produce a resultant wave at a frequency that is the difference of the frequencies of the two introduced waves.

In one embodiment according to the invention, a 100 kHz carrier frequency is modulated with a 5 kHz signal to produce a first primary sideband frequency signal of 95 kHz and a second primary sideband frequency signal of 105 kHz, while the 100 kHz carrier frequency is suppressed. The modulator advantageously produces the primary and secondary sideband frequencies in phase-locked relationship. The transmission characteristics of the ground are such that these two primary frequency signals, if directly introduced into the ground, would rapidly be attenuated. The two primary frequency signals are coupled into a power amplifier and the output of the power amplifier is applied to a transmitter transducer to introduce the two primary waves into a waveguide. The waveguide medium is of elastic silicone rubber material formed into a basically cylindrical shape having sufficient length in the direction of interest to accommodate at least one wavelength of the two introduced primary frequencies and having a nonlinear characteristic which produces a secondary acoustic wave whose frequency is the difference of the two primary frequencies, e.g., 10 kHz, and which is concentrated into a narrow beam of energy that may be directed into the ground through which it propagates with relatively little amplitude attenuation as compared to the two primary frequencies.

DESCRIPTION OF THE DRAWING

The foregoing objects and features may be come more apparent when the ensuing description is read together with the drawing in which.

GENERAL DESCRIPTION

Figure 1:
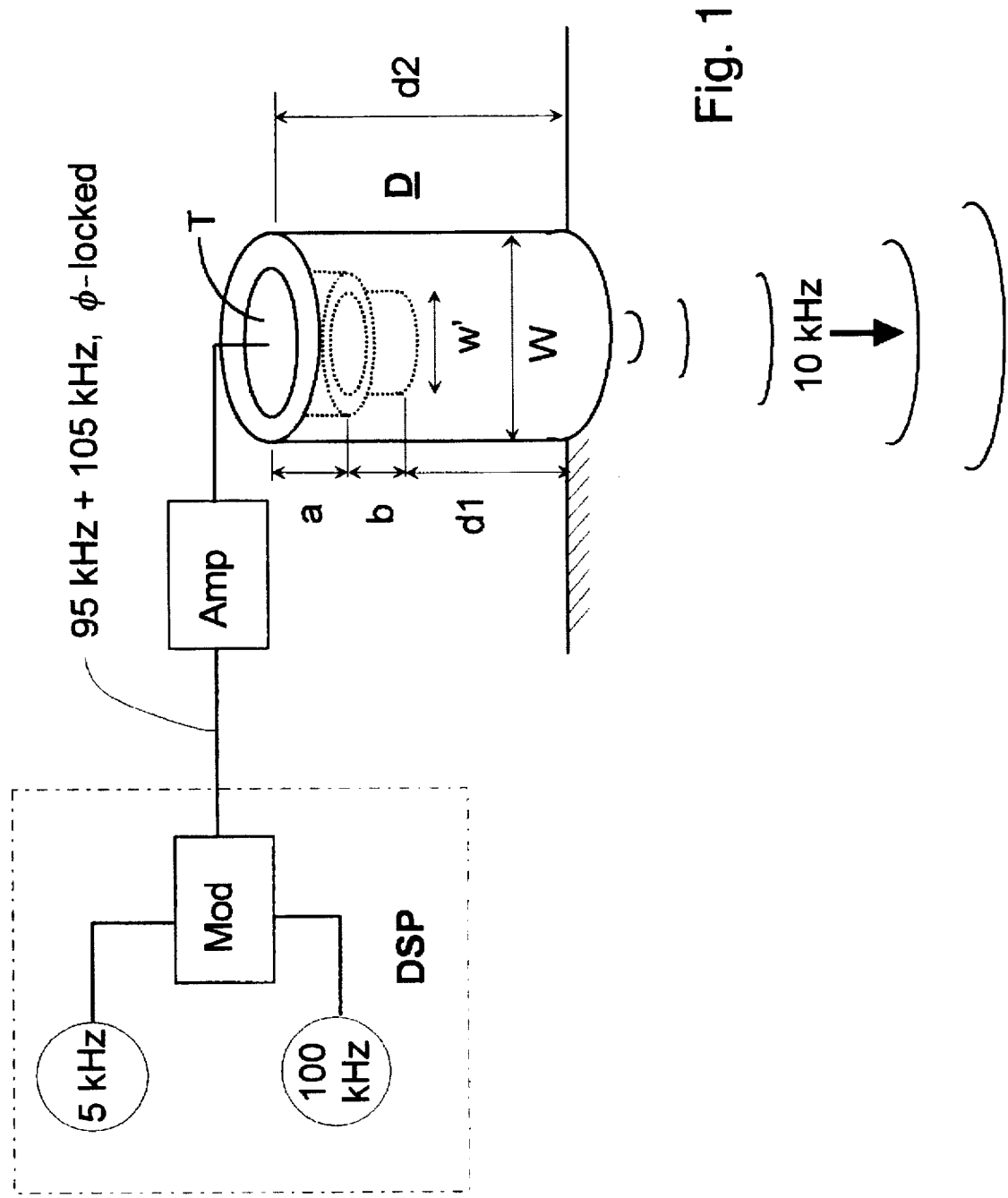
FIG. 1 is schematic diagram in which a digital signal processor generates the two primary frequencies that are applied to a modulator and introduced into a substantially cylindrical waveguide to direct a third frequency wave suitable for ground-penetrating echo location of buried objects.

Referring to FIG. 1, two initial frequency signals, illustratively, 5 kHz and 100 kHz, each advantageously synthesized digitally in digital signal processor DSP, are applied to modulator Mod to produce double sideband, suppressed carrier sum and difference frequencies, illustratively 95 kHz and 105 kHz, that are phase-locked to each other. These sum and difference frequencies, sometimes referred to herein as the "primary" or driving frequencies are such that, if they were introduced directly into the ground, would suffer rapid amplitude attenuation. (It is believed that frequencies above about 14 kHz, attenuation rapidly becomes too severe for direct use as a ground beam for locating buried objects.) Considerations affecting the choice of driving frequencies used to form the beam at a frequency equal to the difference between the two driving frequencies are as follows: If driving frequencies that are too high are used, their wavelengths may be so short relative to the axial length of the waveguide as to permit many cycles of the driving waveforms to be contained within the waveguide. While this may permit sufficient parametric interaction between the waveforms to produce the difference frequency desired for the beam, too long a waveguide undesirably attenuates the driving waveforms so that the beam emerging at the distant end of the waveguide may be too weak adequately to penetrate the ground. Accordingly, the choice of driving frequencies and waveguide length should be such as to accommodate just one or perhaps a few cycles of the driving frequencies to achieve appropriate parametric interaction. For example, if the ratio between the driving frequencies and their difference frequency, i.e., the beam frequency were 10:1, e.g., 100 kHz and 10 kHz, ten cycles of the 100 kHz driving waveforms could be present for each cycle of the 10 kHz beam frequency. Since the parametric interaction may be characterized as a sampling process, fewer cycles of the driving frequencies need be present within a given axial length of waveguide provided that the two driving waveforms are phase locked to each other. Beam frequencies below 14 KHz, particularly in the vicinity of 10 kHz provide useful narrow beams having negligible side lobes without too much attenuation in through-the-ground travel, while beam frequencies in the range of 1–2 kHz provide lower attenuation but are less narrowly focused.

The primary frequencies are applied via power amplifier Amp and transducer T to parametric waveguide D made of silastic material. Waveguide D is of substantially cylindrical shape having a major diameter W and an overall length d2. The upper portion of waveguide D is provided with stepped recesses a and b, recess b having a width w' to accommodate the shape of the transducer T. Any air gaps between transducer T and the recesses in waveguide D is eliminated as much as possible by filling all spaces with petroleum jelly. The length d1 of the waveguide from the bottom of recess b to end of the transducer is sufficiently long to accommodate a full wavelength of both of the primary frequency waves launched into the waveguide by transducer T.

In the illustrative embodiments of the examples hereinafter listed, the dimensions of the waveguide D were as follows:

| Item | Size (in) | Manufacturer/Model |
|---|---|---|
| a | 1.75 | N/A |
| b | 2 | |
| d1 | 8.63 | |
| d2 | 12.6 | |
| w' | 8.48 | |
| W | 10 | |
| T | 9 | International Transducer Corp., Santa Monica, CA./ EBSS, piezo-electric/7-elements, driven to produce ≈ 200 dB micropascal and embedded in petroleum jelly, such as Vaseline. |

The silastic material of waveguide D is such that it has the property of varying the velocity of propagation of the acoustic waves that have been introduced into it in accordance with the variation in the instantaneous density of the medium produced by the pressure of each of the wavefronts. More particularly, this may be expressed as:

$$C = \sqrt{\frac{B}{r}} \quad (1)$$

where B is the adiabatic bulk modulus of elasticity of the silastic medium and r is its density. Practical waveguides should preferably employ silastic materials having a B of about 10,000 psi and a specific gravity ranging from about 1.2 to about 3. Prior to selecting a particular material, however, it is necessary to investigate the impedance of the material. The characteristic acoustic impedance of the material may be defined as the ratio of the pressure to particle speed for either the forward or backward acoustic waves. This impedance involves the inertial and elastic properties of the material and is given by:

$$Z_o = \sqrt{rB} \quad (2)$$

or, in other words, the characteristic impedance is given by the square root of the product of the density and the adiabatic bulk modulus of elasticity of the material. Substituting equation 1 into equation 2 yields:

$$Z_o = \sqrt{r(rC^2)} = rC$$

Therefore, the impedance equals the product of the density and the wave velocity. Because the waveguide offers a lower impedance to a slower wave (and a slower wave is desired in order to allow the parametric beam to form in a shorter distance), the power level input to the waveguide by the transducer drive must be increased in order to maintain the same level of acoustic energy. For example, if the wave velocity is reduced by a factor of two in order to make the parametric wave form in a length of less than 0.9 meter, the impedance of the silastic at the interface to the transducer will be reduced by a factor of two. Therefore, the drive current supplied to the transducer must be increased by a factor of the square root of 2, since acoustic power is equal to the product of the square of the drive current and the impedance.

Three types of silastic medium were examined, as follows:

EXAMPLE 1

To form a first example of the waveguide, a silicone polymer elastomer, commercially known as "GE615", available in the form of a base and curing agent was thoroughly mixed in a 10:1 weight ratio. The mixture was agitated gently to reduce the amount of air entrained during mixing as air bubbles in the molded product would produce undesired effects. The mixture was allowed to set for 30 minutes prior to pouring into a mold formed from a 10 inch inside diameter PVC pipe that had been sectioned and sealed with cloth-backed tape. Silicone grease was used as a mold release. A final cure was achieved after approximately seven days. Specific gravity was calculated to be 1.02. Hardness, per Shore A durometer, is specified as 44.

EXAMPLE 2

The waveguide was formed of a silicone elastomer commercially known as Dow Corning "SYLGUARD 160" available in the form of a base and curing agent was thoroughly mixed in a 1:1 weight ratio. The mixture was agitated gently to reduce the amount of air entrained during mixing as air bubbles were not desired in the molded product. The mixture was allowed to set for approximately 60 minutes prior to pouring into a mold formed from a 10 inch inside diameter PVC pipe that had been sectioned and sealed with cloth-backed tape. Silicone grease was used as a mold release. A final cure was achieved after approximately seven days. Specific gravity was measured to be 1.6. Hardness, per Shore A Durometer, is specified as 57.

EXAMPLE 3

The waveguide was formed of a silicone elastomer commercially known as Dow Corning "SYLGUARD 184" available in the form of a base and curing agent was thoroughly mixed in a 10:1 weight ratio. The mixture was agitated gently to reduce the amount of air entrained during mixing as air bubbles were not desired in the molded product. The mixture was allowed to set for approximately 30 minutes prior to pouring into a mold formed from a 10 inch inside diameter PVC pipe that had been sectioned and sealed with cloth-backed tape. Silicone grease was used as a mold release. A final cure was achieved after approximately seven days. Specific gravity was measured to be 1.06. Hardness, per Shore A Durometer, is specified as 40.

Further measurement indicated that the acoustic plane-wave velocity was 1.027 millimeters per microsecond or 3.369 feet/millisecond.

OPERATION

The DSP illustratively supplies three fundamental types of drive to transducer T.: (a) chirp drive; (b) time series drive; or (c) frequency domain drive. The chirp drive provides a waveform that incrementally increases in frequency to allow the user to determine the best set of operating frequencies for the particular geophysical conditions encountered. While lower frequencies tend to penetrate the ground with less attenuation than higher frequencies, they afford less spatial resolution. The use of chirp techniques allow the operator to choose a transmitter pulse ranging from a minimum value of approximately 2 kHz to a maximum value of approximately 10–14 kHz. When the echo signal is received and processed, all frequency components are summed to approximate an impulse, that is, a pulse of very short duration and high amplitude. This technique allows the operator to use a lengthy transmitter waveform which will support high resolution detection methods yet allow the detection of pipes lying very close to the transmitter and receiver since close-in pipes will have shorter travel times. Analysis of the data returned will normally show a maximum of signal-to-noise ration over some narrow band of frequencies. The time series drive generates a transmitted pulse of energy at, illustratively 10 kHz, for a short time interval, illustratively, about 0.8 msec; gates on the receiving amplifier for a specified time interval; filters the returned echo signal and displays the results to the operator. Data from a sequence of echo returns may be displayed in the "waterfall" mode in which the oldest sequence of echo signals appears on the computer screen in the upper right-hand portion and the newest in the lower lefthand portion.

The scenario for collection the echo returned from underground involves placing the transducer at a point on the ground, energizing the transducer with predetermined duration pulses of the primary driving frequencies, employing a receiving transducer to pick up the echoes, analyzing the "waterfall" pattern of the received signals, and repeating the process at other points on the ground. When the transducers are moved into an area over a particular kind of underground structure, such as a buried pipe, a change in the waterfall display will be seen due to the acoustic signal reflected by the pipe. The operator must then move the transducers across and parallel to the suspected pipe position in order to verify that a pipe is causing the reflection rather than some other object, such as a rock. If the operator has found a buried pipe, it is to be expected that the return energy will be collected along the linear path of the pipe. When limited duration bursts of the primary driving frequencies are employed, Fourier analysis predicts that the frequency response will have a characteristic "sine x over x" shape, with the distances between peaks related to the burst duration. As the difference between the two primary driving frequencies is decreased in order to obtain a lower frequency beam, it is necessary to provide longer duration bursts of the driving frequencies in order to get a sufficiently distinctive peak at the third frequency. However, a longer pulse duration not only increases the driving power requirements but may prevent reception of some echoes because the receiver cannot be turned on until the transmitting burst is finished. Practical implementations therefore will be found to lie within the range of beam frequencies of 4 to 14 kHz at compatible pulse durations.

What has been described is deemed to be illustrative of the principles of the invention. Numerous modifications will be apparent to those skilled in the art without however departing from the spirit and scope of the invention.

What is claimed is:

1. A method of generating an echo location beam for locating underground structures, comprising:
   a. driving an acoustic generator with two frequencies each of whose amplitude would be rapidly attenuated in surface or through-the-ground transmission, and
   b. coupling said acoustic generator to the ground through a waveguide having a nonlinear characteristic which produces a narrow beam of acoustic energy having negligible side lobes at a third frequency that is relatively unattenuated by through-the-ground transmission.

2. A method of generating an echo location beam according to claim 1 wherein said third frequency is substantially equal to the difference between said two frequencies.

3. A method of generating an echo location beam according to claim 2, wherein said waveguide is comprised of silastic material.

4. A method of generating an echo location beam according to claim 1, wherein said two frequencies produce a pressure wave in said waveguide which modifies the density thereof.

5. A method of generating an echo location beam according to claim 1, wherein the length of said waveguide is sufficient to contain at least one wavelength of each of said two frequencies.

6. A method of generating an echo location beam according to claim 1, wherein said two frequencies produce a pressure wave in said waveguide which modifies the adiabatic bulk modulus of elasticity thereof.

7. A method of generating an echo location beam according to claim 1, wherein said acoustic generator is driven with limited duration bursts of said two frequencies.

8. A method of generating an echo location beam according to claim 1, wherein said two frequencies are phase locked to each other.

9. A method of generating an echo location beam according to claim 8, wherein said two frequencies are in the range of 90 to 150 kHz and wherein the difference between said two frequencies lies within the range of 1 to 14 kHz.

10. A method of generating an echo location beam according to claim 7 wherein the duration of said bursts lies in the range of 0.5 to 10.0 milliseconds.

11. An acoustic waveguide for coupling an echo locating beam wave into the ground comprising:
    a member of silastic material having a density ranging from about 1.2 to about 3 and an adiabatic bulk modulus of elasticity not less than about 10,000 psi, said member having at its one end opposite the end to be disposed toward the ground, a cavity for accommodating a piezo-electric transducer.

12. An acoustic waveguide according to claim 11, wherein said member has a substantially cylindrical shape, an outside diameter in the range from about 3 inches to about 10 inches and an axial length in the range from about 3 inches to about 10 inches.

13. An acoustic waveguide according to claim 12, wherein the axial length of said member is related to the wavelength of a pair of frequencies to be introduced into said member by said transducer such that at least one wavelength of each of said two frequencies can be contained within said axial length.

14. An acoustic waveguide according to claim 13, wherein the wavelength of each of frequencies introduced into said member is less than said axial length.

15. An acoustic waveguide for interposition between a sonic transducer and the ground, comprising:

a substantially cylindrical body of silastic material in which the speed of sound C is given by $$C = \sqrt{\frac{B}{r}}$$

where B is the adiabatic bulk modulus of elasticity and r is the density of said material, said material having an axial length of at least one wavelength of each of a pair of primary frequencies introduced into said body by said transducer.

16. An acoustic waveguide according to claim 15, wherein the characteristic impedance of said material approaches the characteristic impedance of the ground.

17. A method of generating an echo location beam for locating underground structures, comprising: (a) generating two phase locked frequencies each of whose amplitude would be rapidly attenuated in surface or through-the-ground transmission, and (b) coupling said two frequencies into a elastomeric waveguide to produce a beam of acoustic energy at a third frequency that is relatively unattenuated by through-the-ground transmission.

18. A method of generating an echo location beam according to claim 17 wherein said waveguide has a dimension sufficient to accommodate parametric interaction between said frequencies in said elastomeric waveguide.

19. A method of generating an echo location beam according to claim 18 wherein said waveguide has a dimensional length sufficient to contain at least a wavelength of said two frequencies.

20. A method of generating an echo location beam according to claim 18, wherein said waveguide has a bulk modulus of elasticity B, a density r to provide a characteristic impedance given by:

$$Z_o = \sqrt{rB}$$

and wherein said third frequency is equal to about the difference between said two frequencies.

* * * * *